(12) United States Patent
Fukawatase

(10) Patent No.: US 8,820,778 B2
(45) Date of Patent: Sep. 2, 2014

(54) AIRBAG DEVICE FOR FRONT PASSENGER'S SEAT

(75) Inventor: Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/809,461

(22) PCT Filed: Jul. 19, 2011

(86) PCT No.: PCT/JP2011/066376
§ 371 (c)(1),
(2), (4) Date: Jan. 10, 2013

(87) PCT Pub. No.: WO2013/011564
PCT Pub. Date: Jan. 24, 2013

(65) Prior Publication Data
US 2014/0210189 A1    Jul. 31, 2014

(51) Int. Cl.
*B60R 21/205* (2011.01)

(52) U.S. Cl.
CPC .................................. *B60R 21/205* (2013.01)
USPC ...................................... 280/728.2; 280/732

(58) Field of Classification Search
USPC ............................................. 280/728.2, 732
See application file for complete search history.

(56) References Cited

U.S. PATENT DOCUMENTS

| | | | |
|---|---|---|---|
| 5,398,968 A * | 3/1995 | Emambakhsh et al. | ... 280/743.1 |
| 5,873,598 A * | 2/1999 | Yoshioka et al. | ............. 280/740 |
| 5,884,939 A | 3/1999 | Yamaji et al. | |
| 5,944,344 A * | 8/1999 | Yoshioka et al. | ............. 280/740 |
| 6,022,043 A | 2/2000 | Harnisch et al. | |
| 6,029,996 A * | 2/2000 | Yoshioka et al. | ............. 280/740 |
| 6,619,691 B1 * | 9/2003 | Igawa | ............. 280/732 |
| 6,676,147 B2 * | 1/2004 | Ozaki et al. | ............. 280/240 |
| 7,011,336 B2 * | 3/2006 | Sommer et al. | ............. 280/728.2 |
| 7,083,186 B2 * | 8/2006 | Lutz et al. | ............. 280/728.3 |
| 7,900,958 B2 * | 3/2011 | Yamauchi et al. | ............. 280/732 |
| 2003/0230873 A1 | 12/2003 | Bayer | |
| 2006/0220355 A1 | 10/2006 | Yokoyama et al. | |
| 2009/0194982 A1 | 8/2009 | Yamauchi et al. | |

FOREIGN PATENT DOCUMENTS

| | | |
|---|---|---|
| JP | A 8-230598 | 9/1996 |
| JP | A-09-142245 | 6/1997 |
| JP | A-10-217893 | 8/1998 |
| JP | A-2001-130356 | 5/2001 |
| JP | A 2001-328506 | 11/2001 |
| JP | A 2001-354105 | 12/2001 |
| JP | A 2005-212566 | 8/2005 |
| JP | A-2005-529784 | 10/2005 |
| JP | A-2006-281945 | 10/2006 |
| JP | B2 3897917 | 3/2007 |
| JP | A-2009-179267 | 8/2009 |
| JP | A 2011-073498 | 4/2011 |

* cited by examiner

*Primary Examiner* — Drew Brown
(74) *Attorney, Agent, or Firm* — Oliff PLC

(57) ABSTRACT

At an airbag device for a front passenger's seat, due to an inflator being fixed to a front side bottom wall portion that is formed at a vehicle front side and upper side of a rear side bottom wall portion, the inflator is offset toward the vehicle front side with respect to a central axis of a case. Further, the front side bottom wall portion is inclined with respect to the rear side bottom wall portion such that a central axis of the inflator intersects a normal line of the rear side bottom wall portion further toward a vehicle upper side than airbag doors, and due thereto, the inflator is tilted.

7 Claims, 9 Drawing Sheets

AIRBAG DEVICE FOR FRONT PASSENGER'S SEAT

TECHNICAL FIELD

The present invention relates to an airbag device for a front passenger's seat.

BACKGROUND ART

There are conventionally known airbag devices for a front passenger's seat that have an airbag, an inflator that supplies gas to this airbag, and a case that accommodates the airbag and the inflator, and that are provided at the upper portion of the region in front of the front passenger's seat of an instrument panel. Further, among these airbag devices for a front passenger's seat, there are those in which the case has a rear side accommodating portion that accommodates the lower inflating portion of the airbag, and a front side accommodating portion that accommodates the inflator and the general portion, other than the lower inflating portion, of the airbag (see, for example, Japanese Patent Application Laid-Open No. 2009-179267).

SUMMARY OF INVENTION

Technical Problem

However, providing the above-described airbag device for a front passenger's seat at the vertical direction intermediate portion, that is formed curvingly so as to form a convex shape toward the vehicle upper side and rear side between the upper portion and the lower portion at the region in front of the front passenger's seat of an instrument panel, is difficult in terms of space. In particular, this is even more so in cases of an instrument panel that is thin and that is made to be compact in the vehicle vertical direction. Accordingly, the airbag device for a front passenger's seat must be made to be compact in the vehicle vertical direction, in order to make it possible to install the airbag device for a front passenger's seat into the vertical direction intermediate portion of the instrument panel.

The present invention was made in consideration of the above-described problem, and an object thereof is to make an airbag device for a front passenger's seat compact in the vehicle vertical direction.

Solution to Problem

In order to overcome the above-described problem, an airbag device for a front passenger's seat relating to a first aspect of the present invention has: an airbag door provided at a vertical direction intermediate portion that is formed curvingly so as to be convex toward a vehicle upper side and rear side between an upper portion and a lower portion at a region in front of a front passenger's seat of an instrument panel; an airbag that is provided in a folded-up state at a reverse side of the airbag door, and that, when the airbag receives a supply of gas, opens the airbag door and is inflated and expanded at an obverse side of the instrument panel; an inflator that is disc-shaped and is provided at the reverse side of the airbag door and supplies gas to the airbag; a rear side accommodating portion that has a rear side bottom wall portion that is provided at the reverse side of the airbag door and faces the airbag door side, and that accommodates a lower inflating portion, that is positioned at an obverse side of a lower portion of the instrument panel, at the airbag when inflation is completed; and a front side accommodating portion that has a front side bottom wall portion that is formed at a vehicle front side and upper side of the rear side bottom wall portion, and to which are fixed the inflator and a base portion at a general portion that is other than the lower inflating portion at the airbag, and that is inclined with respect to the rear side bottom wall portion such that a central axis of the inflator intersects a normal line of the rear side bottom wall portion further toward a vehicle upper side than the airbag door, and the front side accommodating portion, together with the rear side accommodating portion, structures a box-shaped case that is open at the airbag door side, and the front side accommodating portion accommodates the general portion of the airbag and the inflator.

In accordance with this airbag device for a front passenger's seat, due to the inflator being fixed to the front side bottom wall portion that is formed at the vehicle front side and upper side of the rear side bottom wall portion, the inflator is offset toward the vehicle front side with respect to the central axis of the case. Further, the front side bottom wall portion is inclined with respect to the rear side bottom wall portion such that the central axis of the inflator intersects a normal line of the rear side bottom wall portion further toward the vehicle upper side than the airbag door, and due thereto, the inflator is inclined. Accordingly, the airbag device for a front passenger's seat can be made to be compact in the vehicle vertical direction as compared with a case in which, for example, the front side bottom wall portion is parallel to the direction in which the rear side bottom wall portion extends.

In an airbag device for a front passenger's seat relating to a second aspect of the present invention, in the airbag device for a front passenger's seat relating to the first aspect of the present invention, a plurality of gas jetting-out holes, for jetting-out gas that is supplied to the airbag, are formed so as to be lined-up in a peripheral direction at the inflator, and the airbag device for a front passenger's seat further has a retainer that has a peripheral wall portion that is extended from the front side wall portion toward the airbag door side and surrounds a periphery of the inflator with a direction along the central axis of the inflator being a height direction, and a front portion of the peripheral wall portion is set to a height that covers, of the plurality of gas jetting-out holes, gas jetting-out holes that are positioned at a vehicle front side, and a rear portion of the peripheral wall portion is set to a height that exposes, of the plurality of gas jetting-out holes, gas jetting-out holes that are positioned at a vehicle rear side.

In accordance with this airbag device for a front passenger's seat, gas that is jetted-out from the gas jetting-out holes, other than the gas jetting-out holes that are positioned at the vehicle rear side, among the plural gas jetting-out holes hits the peripheral wall portion of the retainer, and the direction thereof is changed toward the airbag door side, and the gas inflates the general portion of the airbag. On the other hand, the gas jetting-out holes, that are positioned at the vehicle rear side among the plural gas jetting-out holes, are exposed with respect to the rear portion of the peripheral wall portion. Accordingly, the gas that is jetted-out from the gas jetting-out holes that are positioned at this vehicle rear side passes the vehicle upper side of the rear portion of the peripheral wall portion and inflates the lower inflating portion of the airbag.

Here, at the stage of the initial period of inflation of the airbag, the lower inflating portion of the airbag is pushed-against the rear wall portion of the case by the pressure of the gas that is jetted-out from the gas jetting-out holes that are positioned at the vehicle rear side. Due thereto, the central locus of the airbag is deflected further toward the vehicle rear side, and therefore, inflation of the airbag can be completed at an early stage.

An airbag device for a front passenger's seat relating to a third aspect of the present invention is structured such that, in the airbag device for a front passenger's seat relating to the first aspect or the second aspect of the present invention, with a direction along the normal line of the rear side bottom wall portion being a height direction, the rear side bottom wall portion is set at a height that is the same as a lowest end of the inflator, or a height that is positioned further toward the airbag door side than the lowest end of the inflator.

In accordance with this airbag device for a front passenger's seat, the rear side bottom wall portion is set at a height that is the same as the lowest end of the inflator, or a height that is positioned further toward the airbag door side than the lowest end of the inflator. Accordingly, projecting of the rear side bottom wall portion toward the vehicle lower side can be suppressed, and therefore, the airbag device for a front passenger's seat can be made to be even more compact in the vehicle vertical direction.

An airbag device for a front passenger's seat relating to a fourth aspect of the present invention is structured such that, in the airbag device for a front passenger's seat relating to the first aspect or the second aspect of the present invention, a glove box is provided at a vehicle lower side of the rear side bottom wall portion, and the rear side bottom wall portion is formed parallel to a top wall portion of the glove box.

In accordance with this airbag device for a front passenger's seat, because the rear side bottom wall portion is formed parallel to the top wall portion of the glove box, the space between this rear side bottom wall portion and top wall portion of the glove box can be ensured. Due thereto, for example, this space can be effectively utilized for installation of another device.

An airbag device for a front passenger's seat relating to a fifth aspect of the present invention is structured such that, in the airbag device for a front passenger's seat relating to any of the first aspect through the fourth aspect of the present invention, the airbag is set in the folded-up state, by, from a state of being unfolded flat, left and right side portions respectively being folded-up at a central side and made into forms of bellows, and thereafter, the lower inflating portion being rolled in a form of a roll around an axis that extends in a left-right direction.

In accordance with this airbag device for a front passenger's seat, the airbag is set in the folded-up state, by, from a state of being unfolded flat, left and right side portions respectively being folded-up at a central side and made into forms of bellows, and thereafter, the lower inflating portion being rolled in the form of a roll around an axis that extends in the left-right direction. Accordingly, this airbag can easily be accommodated in the case. Further, because the lower inflating portion is rolled in the form of a roll, when the airbag inflates and expands, this lower inflating portion can be inflated easily along the obverse of the lower portion of the instrument panel.

An airbag device for a front passenger's seat relating to a sixth aspect of the present invention is structured such that, in the airbag device for a front passenger's seat relating to any of the first aspect through the fifth aspect of the present invention, the airbag door is a pair of airbag doors that are lined-up in a vehicle front-rear direction, and at which a tear line is formed between respective open end portions thereof, and the tear line is set further toward a vehicle rear side than the central axis of the inflator, and further toward a vehicle front side than an extension line at which a rear end portion at an outer peripheral surface of the inflator is extended along the central axis of the inflator.

In accordance with this airbag device for a front passenger's seat, the tear line, that is formed between the respective open end portions at the pair of airbag doors, is set further toward the vehicle rear side than the central axis of the inflator, and further toward the vehicle front side than an extension line at which the rear end portion at the outer peripheral surface of the inflator is extended along the central axis of the inflator. Accordingly, the length from the open end portion at the airbag door at the vehicle rear side, among the pair of airbag doors, to the hinge portion can be made to be short. Due thereto, for example, when the airbag door at the vehicle rear side is opened accompanying the inflation of the airbag, even in a case in which the passenger of the front passenger's seat is near to this airbag door at the vehicle rear side, the impact that is applied to the passenger from this airbag door at the vehicle rear side can be reduced.

On the other hand, the length from the open end portion at the airbag door at the vehicle front side, among the pair of airbag doors, to the hinge portion can be made to be longer. Due thereto, the airbag door at the vehicle front side can be opened slowly as compared with a case in which the lengths of the pair of airbag doors are set to be equal. Therefore, reaction force toward the vehicle rear side can be imparted to the airbag by this airbag door at the vehicle front side.

In an airbag device for a front passenger's seat relating to a seventh aspect of the present invention, in the airbag device for a front passenger's seat relating to the second aspect of the present invention, the inflator has a first combustion chamber, a second combustion chamber that is formed further toward the airbag door side than the first combustion chamber and is set to a lower output than the first combustion chamber, a plurality of first gas jetting-out holes that communicate with the first combustion chamber and are for jetting-out gas that is supplied to the airbag, a plurality of second gas jetting-out holes that communicate with the second combustion chamber and are for jetting-out gas that is supplied to the airbag, a first igniter for burning a gas generating agent accommodated in the first combustion chamber, and a second igniter for burning a gas generating agent accommodated in the second combustion chamber, and gas jetting-out holes that are exposed with respect to the rear portion of the peripheral wall portion are made to be, among the plurality of second gas jetting-out holes, the gas jetting-out holes that are positioned at the vehicle rear side, and the airbag device for a front passenger's seat further has a control unit that, at a time of a front collision of a vehicle, in a case in which it is judged, on the basis of a signal outputted from a deceleration sensor in accordance with a deceleration of the vehicle, that a collision velocity is greater than or equal to a first threshold value and less than a second threshold value, operates the second igniter and inflates and expands the airbag, and, in a case in which it is judged, on the basis of the signal outputted from the deceleration sensor, that the collision velocity is greater than or equal to the second threshold value, when it is judged, on the basis of a signal outputted from a seat belt switch in accordance with whether or not a seat belt has been applied by a passenger of a front passenger's seat, that the passenger of the front passenger's seat has applied the seat belt, operates the first igniter and inflates and expands the airbag, and, in a case in which it is judged, on the basis of the signal outputted from the deceleration sensor, that the collision velocity is greater than or equal to the second threshold value, when it is judged, on the basis of the signal outputted from the seat belt switch, that the passenger of the front passenger's seat has not applied the seat belt, operates the first igniter and the second igniter and inflates and expands the airbag.

In accordance with this airbag device for a front passenger's seat, the control unit judges the collision velocity before judging whether or not the seat belt is applied. In a case in which the collision velocity is greater than or equal to the first threshold value and less than the second threshold value, the control unit operates the second igniter and inflates and expands the airbag without judging whether or not the seat belt is applied. Accordingly, the processing functions of the control unit can be simplified as compared with a case in which, for example, whether or not the seat belt is applied is judged before the judging of the collision velocity, and therefore, the start of the expanding of the airbag can be made to be earlier.

Further, in a case in which the collision velocity is greater than or equal to the first threshold value and less than the second threshold value, the second igniter is operated, and the airbag is inflated and expanded at low pressure. On the other hand, in a case in which the collision velocity is greater than or equal to the second threshold value, when the passenger of the front passenger's seat has applied the seat belt, the first igniter is operated, and the airbag is inflated and expanded at medium pressure. Further, in a case in which the collision velocity is greater than or equal to the second threshold value, when the passenger of the front passenger's seat has not applied the seat belt, the first igniter and the second igniter are operated, and the airbag is inflated and expanded at high pressure. Accordingly, because the airbag is inflated and expanded at the appropriate pressure that corresponds to the collision velocity and whether or not the seat belt is applied, the passenger of the front passenger's seat can be protected appropriately.

Further, at the inflator that is provided at the airbag device for a front passenger's seat, the second combustion chamber, that is set to a low output, is positioned further toward the side of the airbag door than the first combustion chamber. Accordingly, for example, even if the passenger of the front passenger's seat has not applied the seat belt and is in a state of being near to the instrument panel, the airbag can be inflated and expanded at an early stage. Due thereto, this passenger can be restrained rapidly.

Advantageous Effects of Invention

As described above, in accordance with the present invention, an airbag device for a front passenger's seat can be made to be compact in the vehicle vertical direction.

DESCRIPTION OF EMBODIMENTS

An embodiment of the present invention is described hereinafter with reference to the drawings.

Note that arrow UP and arrow FR that are shown in the respective drawings respectively indicate the vehicle vertical direction upper side and the vehicle front-rear direction front side.

Figure 1:
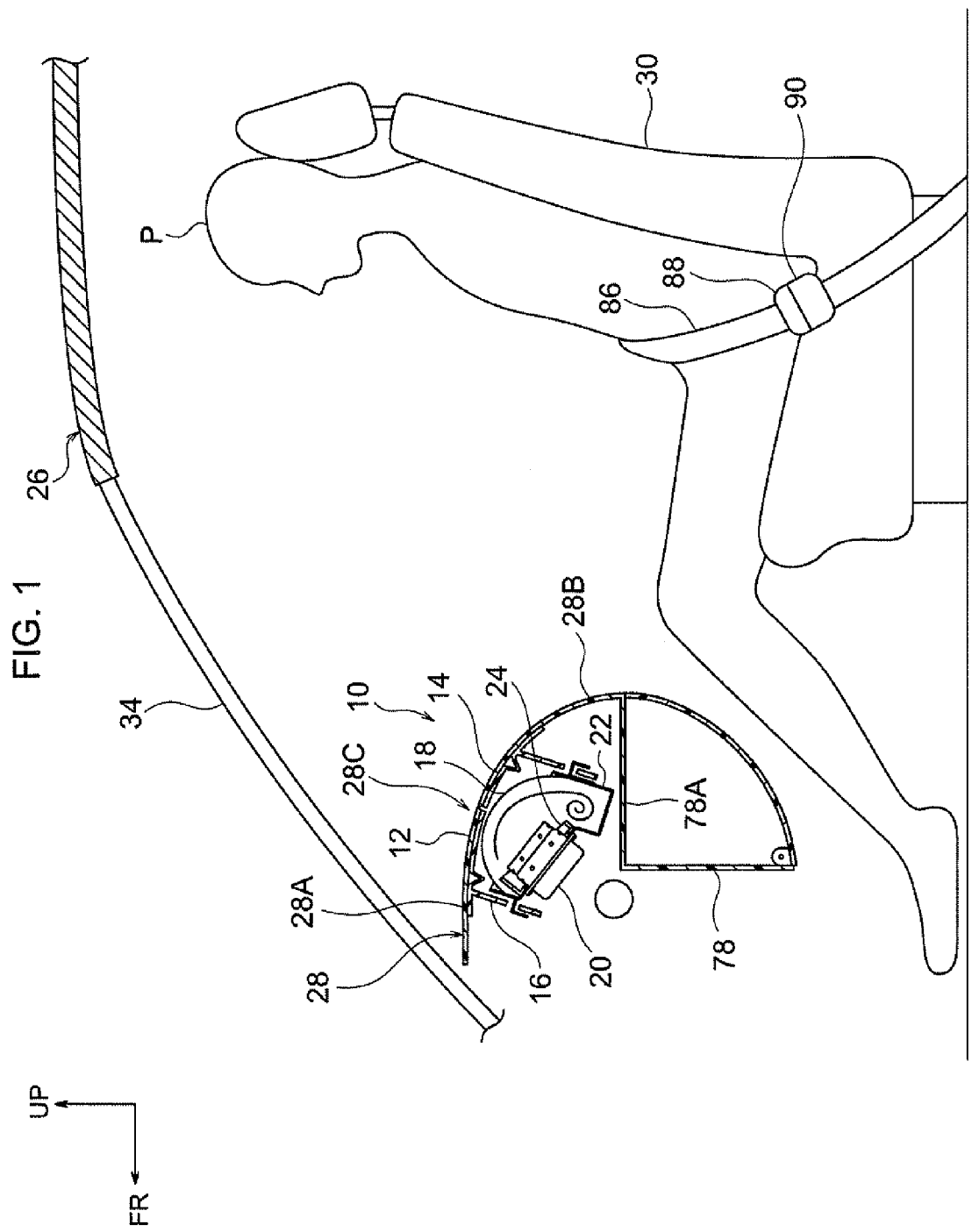
FIG. 1 is a side sectional view of a vehicle cabin front portion at a vehicle to which an airbag device for a front passenger's seat relating to an embodiment of the present invention is applied.

As shown in FIG. 1, an airbag device 10 for a front passenger's seat relating to an embodiment of the present invention has a pair of airbag doors 12, 14, a holding member 16, an airbag 18, an inflator 20, a case 22, and a retainer 24.

An instrument panel 28 that extends in the vehicle transverse direction is provided at the vehicle cabin front portion of a vehicle 26 to which this airbag device 10 for a front passenger's seat is applied. A vertical direction intermediate portion 28C, that bends so as to form a convex shape toward the vehicle upper side and rear side between an upper portion 28A and a lower portion 28B, is formed at the region in front of a front passenger's seat 30 at this instrument panel 28, and the pair of airbag doors 12, 14 are provided at this vertical direction intermediate portion 28C.

Namely, this airbag device 10 for a front passenger's seat is a mid-mount-type airbag device for a front passenger's seat at which the pair of airbag doors 12, 14 are provided at the vertical direction intermediate portion 28C.

Figure 2:
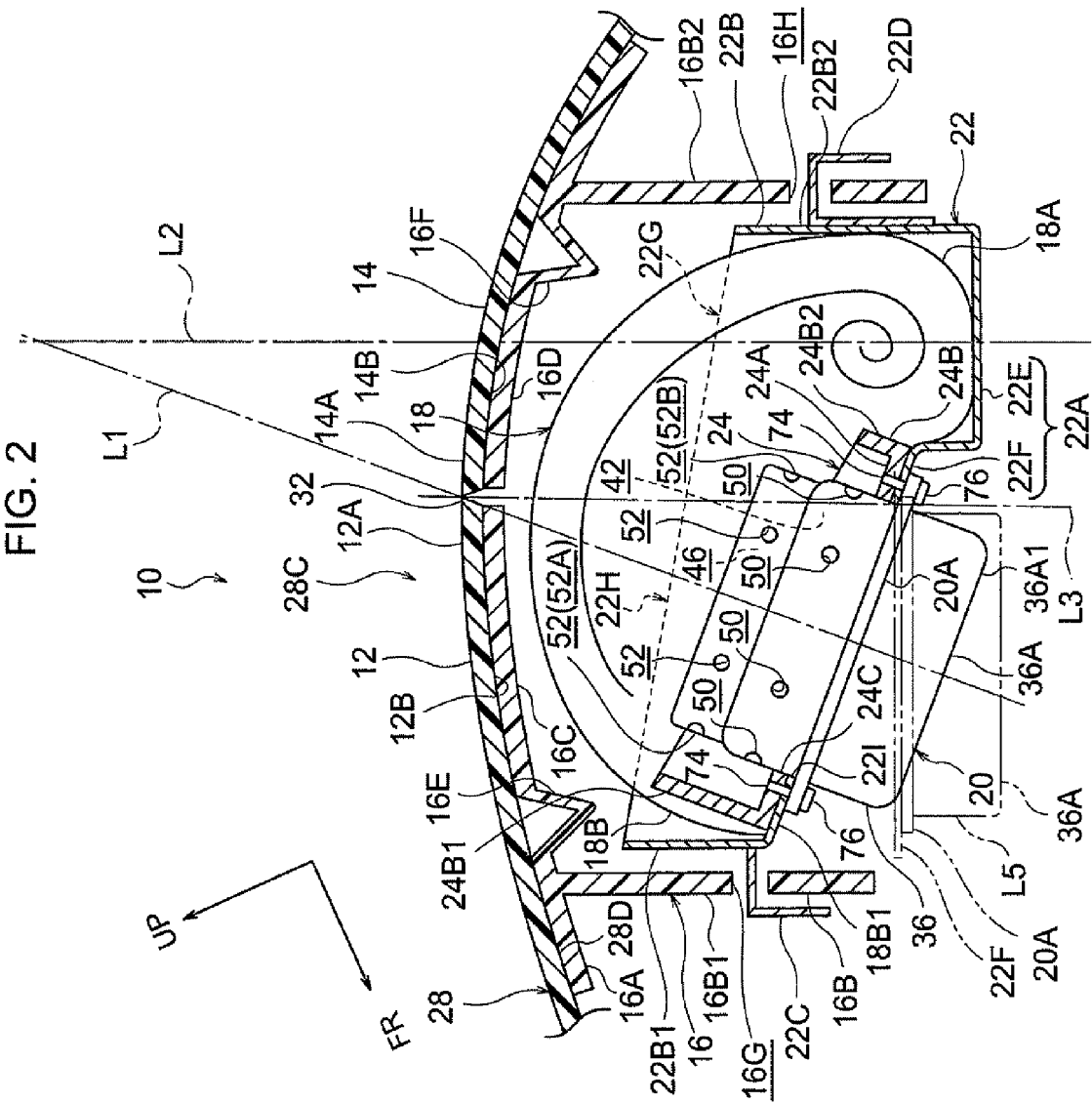
FIG. 2 is an enlarged sectional view of main portions of FIG. 1.

As shown in FIG. 2, the pair of airbag doors 12, 14 are lined-up in the vehicle front-rear direction, and a tear line 32, that extends in the vehicle transverse direction is formed between open end portions 12A, 14A thereof. This tear line 32 is set at the intersecting portion of a central axis L1 of the inflator 20 that is described later and a central axis L3 of the case 22.

The holding member 16 is provided at the reverse side of the instrument panel 28, and is structured to have a flange portion 16A, a frame portion 16B, a pair of door reinforcing portions 16C, 16D, and a pair of hinge portions 16E, 16F. The flange portion 16A is formed in the shape of a frame along the peripheral portions of the pair of airbag doors 12, 14, and is joined to a reverse surface 28D of the instrument panel 28 by, for example, welding or the like.

The frame portion 16B is formed in the shape of a frame along the inner side portion of the flange portion 16A, and projects toward the vehicle front side and the vehicle lower side from this flange portion 16A. In a front wall portion 16B1 and a rear wall portion 16B2 at this frame portion 16B, anchor holes 16C; 16H, that pass-through in the thickness directions thereof, are formed respectively.

The pair of door reinforcing portions 16C, 16D are joined to respective reverse surfaces 12B, 14B of the pair of airbag doors 12, 14 by, for example, welding or the like. Further, this pair of door reinforcing portions 16C, 16D are connected, via the hinge portions 16E, 16F, to the front wall portion 16B1 and the rear wall portion 16B2 at the frame portion 16B, respectively. These hinge portions 16E, 16F are respectively formed such that the cross-sectional shape, when cut along the vehicle vertical direction, forms a V-shape.

Figure 3:
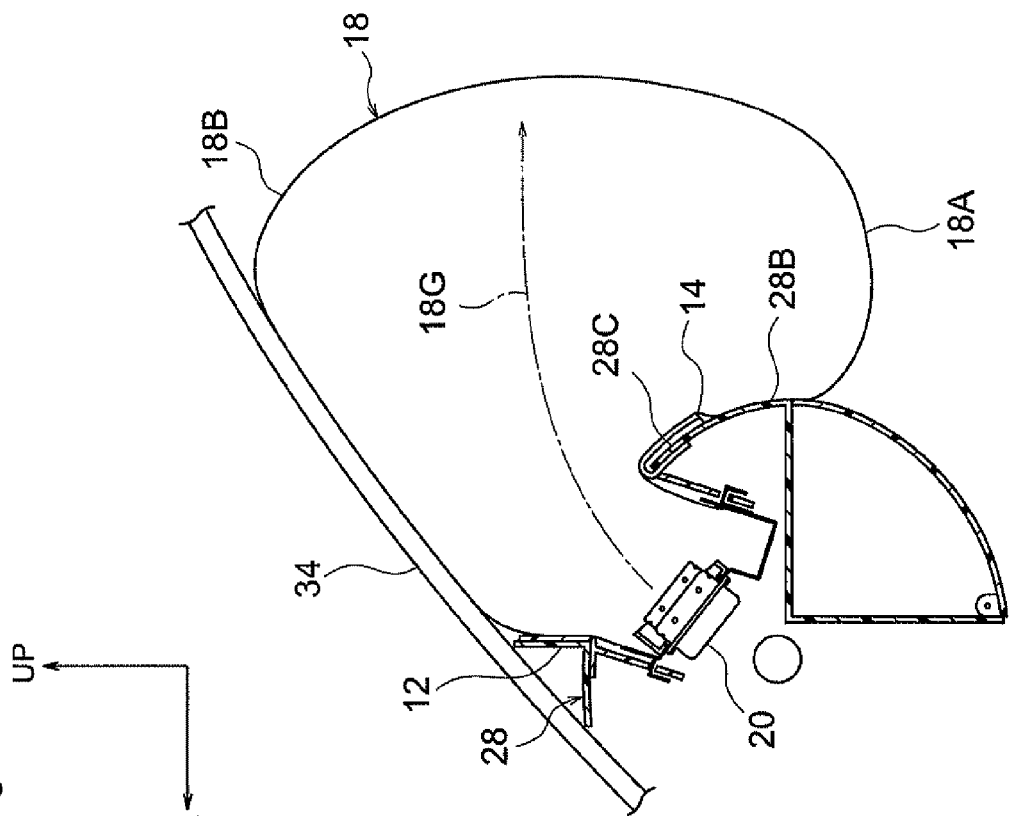
FIG. 3 is a drawing that explains the state of an airbag being expanded in the airbag device for a front passenger's seat shown in FIG. 1.
Figure 3:
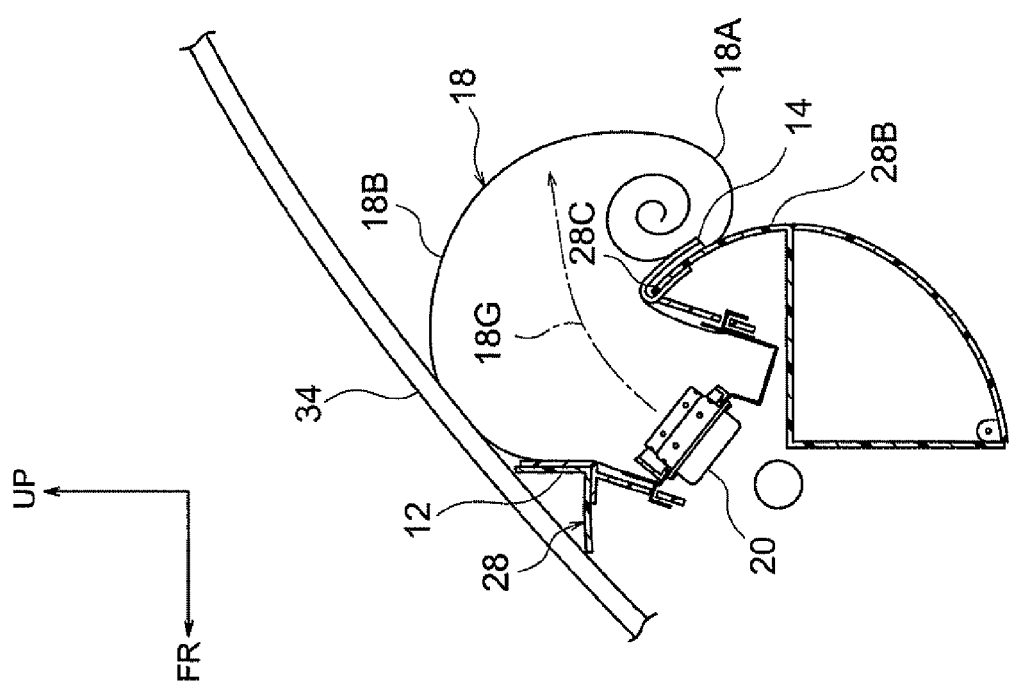

The airbag 18 is provided in a folded-up state in the case 22 that is described later. As shown in FIG. 3, when this airbag 18 receives a supply of gas from the inflator 20, the airbag 18 opens the pair of airbag doors 12, 14 and is inflated and expanded at the obverse side of the instrument panel 28.

As shown in the right drawing of FIG. 3, this airbag 18 is structured by a lower inflating portion 18A that is positioned at the obverse side of the lower portion 28B of the instrument panel 28 at the time when inflation is completed, and a general portion 18B that is other than this lower inflating portion 18A. At the time of completion of inflation of the airbag 18, the general portion 18B is in a state of being pushed against the vertical direction intermediate portion 28C (the peripheral portion of the opening portion that is formed by the pair of airbag doors 12, 14 being opened) and a front glass 34.

Figure 4:
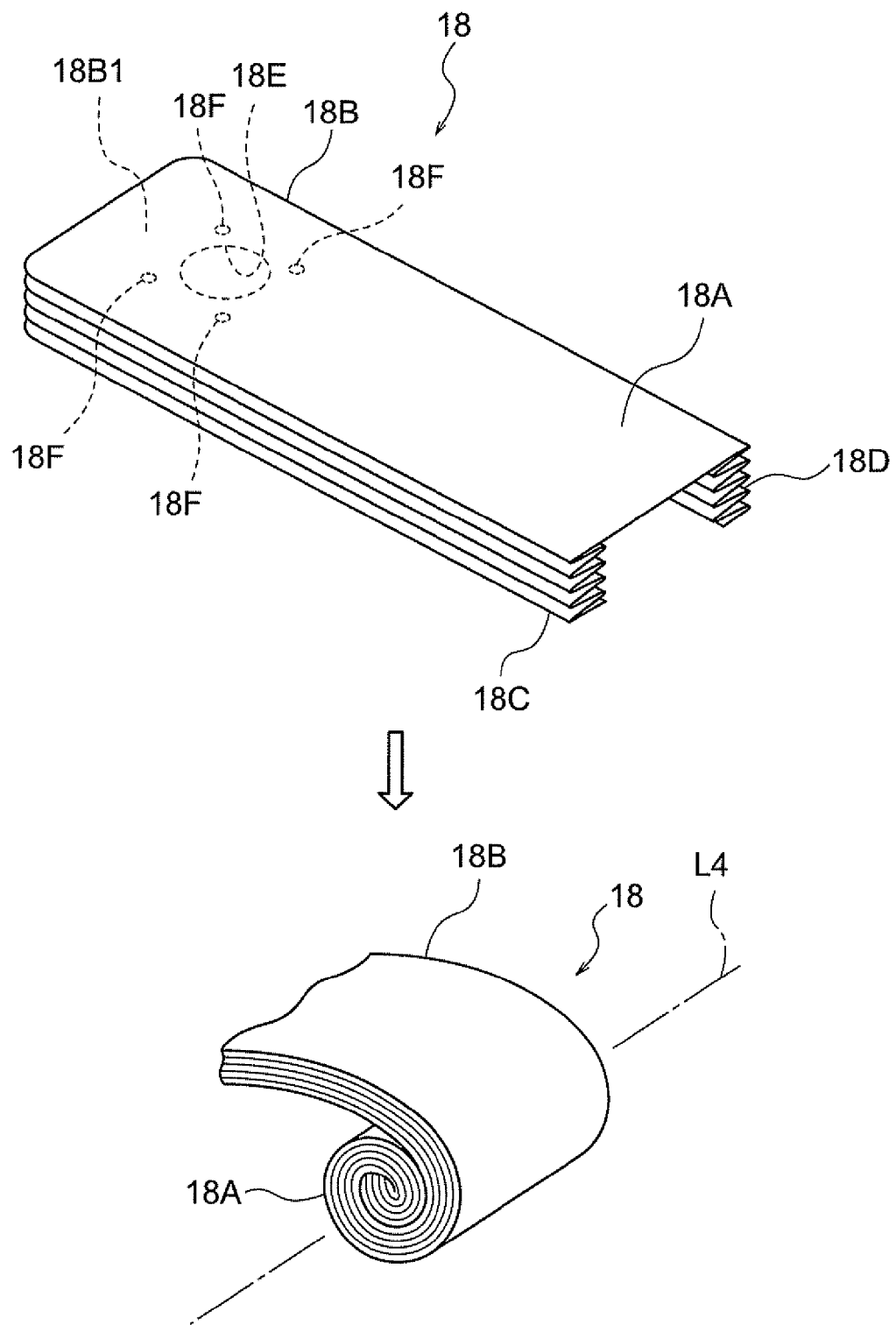
FIG. 4 is a drawing that explains a method of setting the airbag shown in FIG. 1 in a folded-up state.

As shown in the upper drawing of FIG. 4, this airbag 18 is set in the aforementioned folded-up state (see FIG. 2), by, from a state of being unfolded flat, left and right side portions 18C, 18D respectively being folded-up at the central side and made into forms of bellows, and thereafter, as shown in the lower drawing of FIG. 4, the lower inflating portion 18A being rolled in the form of a roll around an axis L4 that extends in the left-right direction. More concretely, the lower inflating portion 18A is rolled clockwise when viewed from the left side. Further, as shown in the upper drawing of FIG. 4, a mounting hole 18E is formed, and plural hole portions 18F are formed at the periphery of this mounting hole 18E, in a base portion 18B1 (bottom portion) of the general portion 18B that is bag-shaped.

Figure 5:
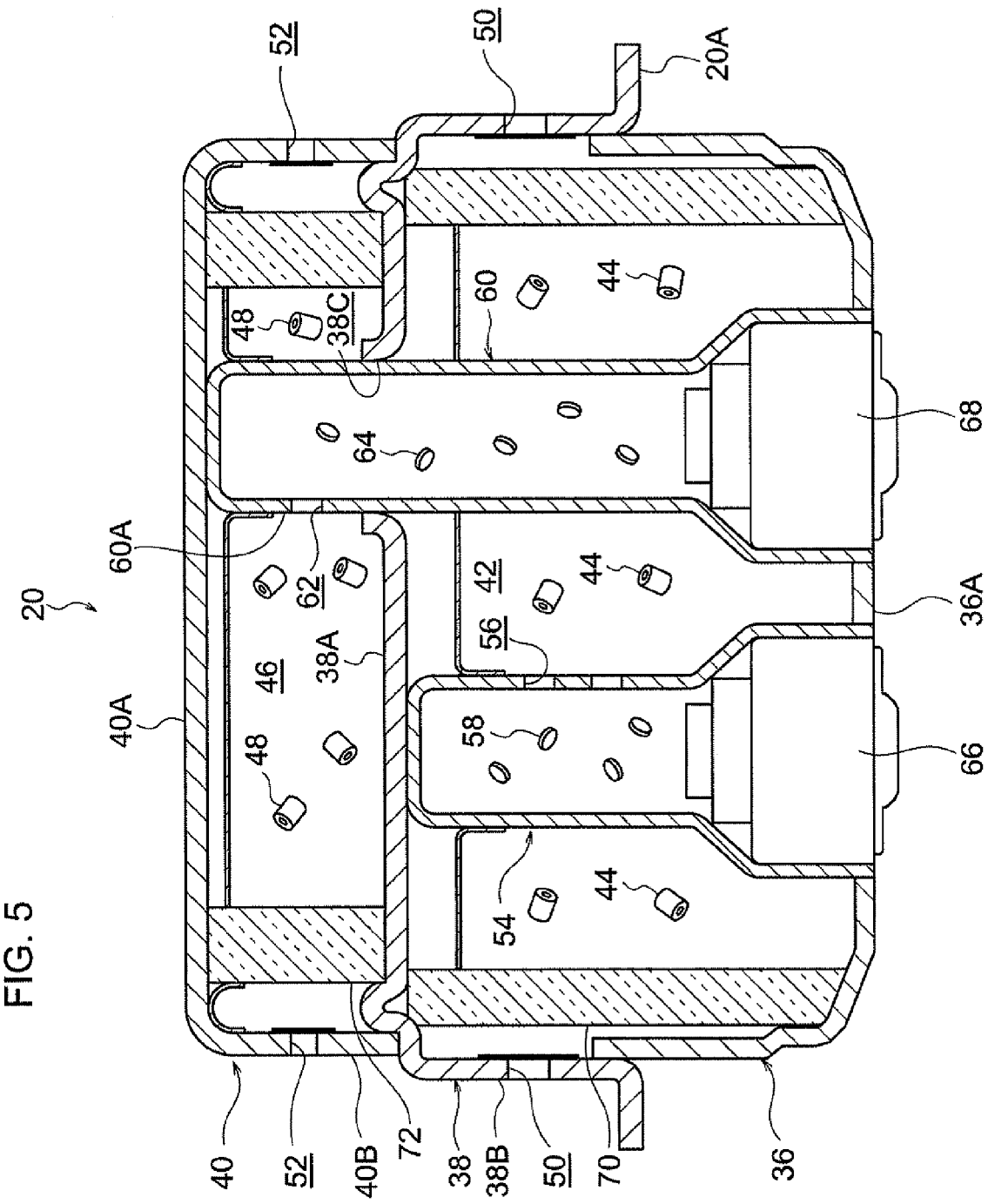
FIG. 5 is an enlarged side sectional view of an inflator shown in FIG. 1.

As shown in FIG. 2, the inflator 20 is provided at the reverse side of the pair of airbag doors 12, 14, and is structured in the form of a disc. As shown in FIG. 5, this inflator 20 has a lower case 36 that is shaped as a cup, a first upper case 38 that is shaped as an upside-down cup, and a second upper case 40 that similarly is shaped as an upside-down cup.

The first upper case 38, together with the lower case 36, forms a first combustion chamber 42. A first gas generating agent 44 is accommodated in this first combustion chamber 42. On the other hand, the second upper case 40 has a ceiling wall portion 40A and a peripheral wall portion 4013, and this ceiling wall portion 40A and peripheral wall portion 40B, together with a ceiling wall portion 38A of the first upper case 38, form a second combustion chamber 46. This second combustion chamber 46 is formed further toward the side of the pair of airbag doors 12, 14 than the first combustion chamber 42 (see FIG. 2). A second gas generating agent 48 is accommodated in this second combustion chamber 46.

This second combustion chamber 46 is made to have a smaller volume than the first combustion chamber 42 by the height of the second combustion chamber 46 being made to be lower than the first combustion chamber 42. There is a smaller amount of the second gas generating agent 48, that is accommodated in this second combustion chamber 46, than the first gas generating agent 44 that is accommodated in the first combustion chamber 42. Further, due thereto, the second combustion chamber 46 is set to a lower output than the first combustion chamber 42.

Moreover, plural first gas jetting-out holes 50 are formed in a peripheral wall portion 38B of the first upper case 38 so as to be lined-up in the peripheral direction thereof. Plural second gas jetting-out holes 52 are formed in the peripheral wall portion 40B of the second upper case 40 so as to be lined-up in the peripheral direction thereof. The first gas jetting-out holes 50 communicate with the first combustion chamber 42, and the second gas jetting-out holes 52 communicate with the second combustion chamber 46.

Further, a first inner tube portion 54 that is cylindrical is provided in the first combustion chamber 42. Plural charge transfer holes 56, that are lined-up in the peripheral direction and open to the first combustion chamber 42, are formed in this first inner tube member 54. A first transfer charge 58, for burning the first gas generating agent 44 accommodated in the first combustion chamber 42, is accommodated at the interior of this first inner tube member 54.

A second inner tube member 60, that is cylindrical and that is formed to be longer in the axial direction than this first inner tube member 54, is provided next to this first inner tube member 54. This second inner tube member 60 is inserted-through a hole portion 38C that is formed in the ceiling wall portion 38A of the first upper case 38, and is provided so as to extend from the first combustion chamber 42 to the second combustion chamber 46.

Plural charge transfer holes 62, that are lined-up in the peripheral direction and open to the second combustion chamber 46, are formed in, of this second inner tube member 60, an upper portion 60A that is provided at the interior of the second combustion chamber 46. A second transfer charge 64, for burning the second gas generating agent 48 accommodated in the second combustion chamber 46, is accommodated at the interior of this second inner tube member 60.

Further, a first igniter 66 and a second igniter 68 are accommodated in the lower portion of the first inner tube member 54 and the lower portion of the second inner tube member 60, respectively. This first igniter 66 and second igniter 68 are structured so as to, when operation current is supplied thereto, ignite, and set on fire the aforementioned first transfer charge 58 and second transfer charge 64, respectively.

Moreover, a first filter 70, that is formed in an annular shape along the peripheral wall portion 38B of the first upper case 38, is accommodated in the first combustion chamber 42. A second filter 72, that is formed in an annular shape along the peripheral wall portion 40B of the second upper case 40, is accommodated in the second combustion chamber 46.

As shown in FIG. 2, the case 22 is accommodated at the inner side of the frame portion 16B that is formed at the above-described holding member 16. This case 22 has a bottom wall portion 22A, and a peripheral wall portion 22B that is formed at the periphery of this bottom wall portion 22A, and the case 22 is structured in the shape of a box that opens at the side of the pair of airbag doors 12, 14.

The peripheral wall portion 22B forms a rectangle when viewed from the vehicle upper side, and a pair of anchor plates 22C, 22D are respectively provided at a front wall portion 22B1 and a rear wall portion 22B2 of the peripheral wall portion 22B. This pair of anchor plates 22C, 22D are respectively anchored at the aforementioned anchor holes 16G, 16H.

The bottom wall portion 22A has a rear side bottom wall portion 22E that faces the side of the pair of airbag doors 12, 14, and a front side bottom wall portion 22F that is formed at the vehicle front side and upper side of this rear side bottom wall portion 22E. The rear side bottom wall portion 22E, together with the rear portion of the peripheral wall portion 22B, forms a rear side accommodating portion 22G. The lower inflating portion 18A of the airbag 18 is accommodated in this rear side accommodating portion 22G.

On the other hand, the front side bottom wall portion 22F, together with the front portion of the peripheral wall portion 22B, forms a front side accommodating portion 22H. The general portion 18B of the airbag 18 and the inflator 20 are accommodated in this front side accommodating portion 22H. The depth of the rear side accommodating portion 22G along a normal line L2 of the rear side bottom wall portion 22E is set to be deeper than the depth of the front side accommodating portion 22H along the central axis L1 of the inflator 20.

Further, the front side bottom wall portion 22F is tilted with respect to the rear side bottom wall portion 22E such that the central axis L1 of the inflator 20 intersects the normal line L2 of the rear side bottom wall portion 22E further toward the vehicle upper side than the airbag doors 12, 14. Namely, both the rear side bottom wall portion 22E and the front side bottom wall portion 22F are inclined with respect to the vehicle front-rear direction such that the front end portions thereof are positioned further toward the side of the pair of airbag doors 12, 14 than the rear end portions thereof. However, the angle of inclination of the front side bottom wall portion 22F, with respect to the vehicle front-rear direction, is greater than the rear side bottom wall portion 22E.

Further, with the direction along the normal line L2 of the rear side bottom wall portion 22E being the height direction, the rear side bottom wall portion 22E is set at a height that is positioned further toward the side of the pair of airbag doors 12, 14 than a rear end portion 36A1 of a bottom wall portion 36A of the lower case 36 that corresponds to the lowest end of the inflator 20.

The retainer 24 has a bottom wall portion 24A and a peripheral wall portion 24B, and is formed in the shape of a container that opens toward the side of the pair of airbag doors 12, 14. The bottom wall portion 24A is superposed with the front side bottom wall portion 22F from the side of the pair of airbag doors 12, 14. The peripheral wall portion 22B is formed at the periphery of this bottom wall portion 22A, and extends from the front side bottom wall portion 22F toward the side of the pair of airbag doors 12, 14, with the direction along the central axis L1 of the inflator 20 being the height direction. Further, this peripheral wall portion 22B is formed in the shape of a circle that is concentric with the outer peripheral surface of the retainer 24, and surrounds the periphery of the inflator 20.

A front portion 24B1 of the peripheral wall portion 24B is set to a height that covers, among the plural second gas jetting-out holes 52, gas jetting-out holes 52A that are positioned at the vehicle front side. A rear portion 24B2 of the peripheral wall portion 24B is set to a height that exposes, among the plural second gas jetting-out holes 52, gas jetting-out holes 52B that are positioned at the vehicle rear side. Note that all of the plural first gas jetting-out holes 50, that are positioned further toward the front side bottom wall portion 22F side than the plural second gas jetting-out holes 52, are covered by the peripheral wall portion 24B.

Further, the bottom wall portion 24A of this retainer 24 nips the base portion 18B1 of the general portion 18B between the bottom wall portion 24A and the front side bottom wall portion 22F. A flange portion 20A that is provided at the inflator 20 is superposed with the side, of this front side bottom wall portion 22F, that is opposite the side of the pair of airbag doors 12, 14. One ends of stud bolts 74 are fixed to the bottom wall portion 24A, and these stud bolts 74 pass-through the flange portion 20A and the front side bottom wall portion 22F. Further, due to nuts 76 being screwed-together with the other end sides of these stud bolts 74, the bottom wall portion 24A, the front side bottom wall portion 22F and the flange portion 20A are fastened.

Note that the region of the inflator 20, which region is further toward the upper side than the flange portion 20A, is inserted through a hole portion 22I formed in the front side bottom wall portion 22F, the mounting hole 18E (refer to the upper drawing of FIG. 4) formed in the base portion 18B1 of the general portion 18B, and a hole portion 24C formed in the bottom wall portion 24A of the retainer 24, in that order, and is accommodated at the inner side of the general portion 18B. Further, the aforementioned stud bolts 74 are inserted-through the plural hole portions 18F (refer to the upper drawing of FIG. 4) that are formed at the periphery of the mounting hole 18E.

Further, at this airbag device 10 for a front passenger's seat, the airbag 18 is inflated and expanded as follows.

Namely, when operation current is supplied to the first igniter 66 shown in FIG. 5, this first igniter 66 ignites, and, due thereto, the first transfer charge 58 that is accommodated in the first inner tube member 54 is set on fire. Thus, the first gas generating agent 44 that is accommodated in the first combustion chamber 42 burns and gas is generated, and this gas is jetted-out from the first gas jetting-out holes 50 to the interior of the airbag 18 (see FIG. 2).

On the other hand, when operation current is supplied to the second igniter 68, this second igniter 68 ignites, and, due thereto, the second transfer charge 64 that is accommodated in the second inner tube member 60 is set on fire. Thus, the second gas generating agent 48 that is accommodated in the second combustion chamber 46 burns and gas is generated, and this gas is jetted-out from the second gas jetting-out holes 52 to the interior of the airbag 18.

It is possible for this first igniter 66 and second igniter 68 to be ignited at different times, or to be ignited simultaneously. Further, the second combustion chamber 46 is set to a lower output than the first combustion chamber 42. Accordingly, when the second gas generating agent 48 is combusted at the second combustion chamber 46 and gas is jetted-out from the second gas jetting-out holes 52, the airbag 18 is inflated at low pressure.

On the other hand, when the first gas generating agent 44 is combusted at the first combustion chamber 42 and gas is jetted-out from the first gas jetting-out holes 50, the airbag 18 is inflated and expanded at medium pressure. When the first gas generating agent 44 and the second gas generating agent 48 are combusted respectively at the first combustion chamber 42 and the second combustion chamber 46 and gas is jetted-out respectively from the first gas jetting-out holes 50 and the second gas jetting-out holes 52, the airbag 18 is inflated at high pressure.

Further, the plural first gas jetting-out holes 50 that are shown in FIG. 2, and, among the plural second gas jetting-out holes 52, the gas jetting-out holes other than the gas jetting-out holes 52B that are positioned at the vehicle rear side, are covered by the peripheral wall portion 24B of the retainer 24. Accordingly, the gas that is jetted-out from these gas jetting-out holes abuts the peripheral wall portion 24B of the retainer, and changes direction toward the side of the pair of airbag doors 12, 14, and inflates the general portion 18B of the airbag 18.

On the other hand, of the plural second gas jetting-out holes 52, the gas jetting-out holes 52B that are positioned at the vehicle rear side are exposed with respect to the peripheral wall portion 24B of the retainer 24. Accordingly, the gas, that is jetted-out from these gas jetting-out holes 52B that are positioned at the vehicle rear side, passes the vehicle upper side of the rear portion 24B2 of the peripheral wall portion 24B, and inflates the lower inflating portion 18A of the airbag 18. At this time, the lower inflating portion 18A of the airbag 18 is pushed-against the rear wall portion 22B2 of the peripheral wall portion 22B formed at the case 22 by the pressure of the gas that is jetted-out from the gas jetting-out holes 52B that are positioned at the vehicle rear side, and, due thereto, a central locus 18G of the airbag 18 is deflected further toward the vehicle rear side as shown in FIG. 3.

Then, when inflation of the airbag 18 is completed, the general portion 18B is in a state of being pushed against the vertical direction intermediate portion 28C and the front glass 34, and the lower inflating portion 18A is positioned at the obverse side of the lower portion 28B of the instrument panel 28.

Next, operation and effects of the above-described airbag device 10 for a front passenger's seat are described.

In accordance with this airbag device 10 for a front passenger's seat, as shown in FIG. 2, due to the inflator 20 being fixed to the front side bottom wall portion 22F that is formed at the vehicle front side and upper side of the rear side bottom wall portion 22E, the inflator 20 is offset toward the vehicle front side with respect to the central axis L3 of the case 22. Moreover, the front side bottom wall portion 22F is inclined with respect to the rear side bottom wall portion 22E, such that the central axis L1 of the inflator 20 intersects the normal line L2 of the rear side bottom wall portion 22E further toward the vehicle upper side than the airbag doors 12, 14. Due thereto, the inflator 20 is tilted.

Accordingly, the airbag device 10 for a front passenger's seat can be made to be compact in the vehicle vertical direction, as compared with a case in which, for example, the front side bottom wall portion 22F is parallel to the direction in which the rear side bottom wall portion 22E extends, as shown by imaginary line (two-dot chain line) L5.

Further, the rear side bottom wall portion 22E is set at a height that is positioned further toward the side of the pair of airbag doors 12, 14 than the rear end portion 36A1 of the bottom wall portion 36A of the lower case 36 that corresponds to the lowest end of the inflator 20. Accordingly, projecting of the rear side bottom wall portion 22E toward the vehicle lower side can be suppressed, and therefore, the airbag device 10 for a front passenger's seat can be made to be even more compact in the vehicle vertical direction. As a result, the airbag device 10 for a front passenger's seat can be applied also to thin instrument panels that are made to be compact in the vehicle vertical direction.

Moreover, at the stage of the initial period of inflation of the airbag 18, the lower inflating portion 18A of the airbag 18 is pushed-against the rear wall portion 22B2 of the case 22 by the pressure of the gas that is jetted-out from the gas jetting-out holes 52B that are positioned at the vehicle rear side. Due thereto, as shown in FIG. 3, the central locus 18G of the airbag 18 is deflected toward the vehicle rear side, and therefore, inflation of the airbag 18 can be completed at an early stage.

Further, as shown in FIG. 4, the airbag 18 is set in the folded-up state by, from a state of being unfolded flat, the left and right side portions 18C, 18D respectively being folded-up at the central side and made into forms of bellows, and thereafter, the lower inflating portion 18A being rolled in the formed of a roll around the axis L4 that extends in the left-right direction. Accordingly, this airbag 18 can easily be accommodated in the case 22 (see FIG. 2). Moreover, because the lower inflating portion 18A is rolled in the formed of a roll, when the airbag 18 inflates and expands, this lower inflating portion 18A can be inflated easily along the obverse of the lower portion 28B of the instrument panel 28 as shown in FIG. 3.

A modified example of the above-described airbag device 10 for a front passenger's seat is described next.

In the above-described airbag device 10 for a front passenger's seat, the rear side bottom wall portion 22E is set at a height that is positioned further toward the side of the pair of airbag doors 12, 14 than the rear end portion 36A1 of the bottom wall portion 36A of the lower case 36. However, with the direction along the normal line L2 of the rear side bottom wall portion 22E being the height direction, the rear side bottom wall portion 22E may be set at the same height as the rear end portion 36A1 of the bottom wall portion 36A of the lower case 36.

Even when structured in this way, projecting of the rear side bottom wall portion 22E toward the vehicle lower side can be suppressed, and therefore, the airbag device 10 for a front passenger's seat can be made to be even more compact in the vehicle vertical direction.

Figure 6:
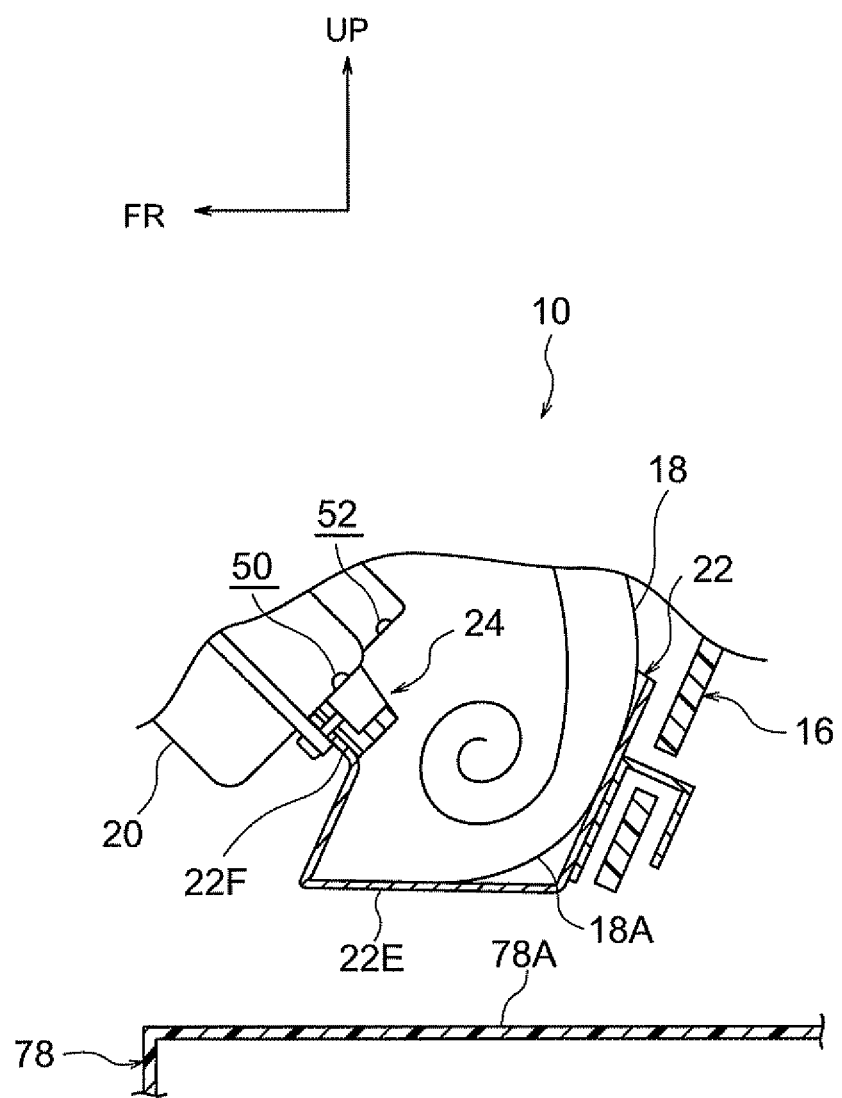
FIG. 6 is a side sectional view of main portions showing a modified example of a rear side bottom wall portion shown in FIG. 2.

Further, in the airbag device 10 for a front passenger's seat, as shown in FIG. 6, the rear side bottom wall portion 22E may be formed parallel to a top wall portion 78A of a glove box 78 that is provided at the vehicle lower side of this rear side bottom wall portion 22E. Note that, in this modified example shown in FIG. 6, the rear side bottom wall portion 22E and the top wall portion 78A extend along the vehicle horizontal direction.

When structured in this way, the space between this rear side bottom wall portion 22E and top wall portion 78A can be ensured. Due thereto, for example, this space can be effectively utilized for installation of another device.

Figure 7:
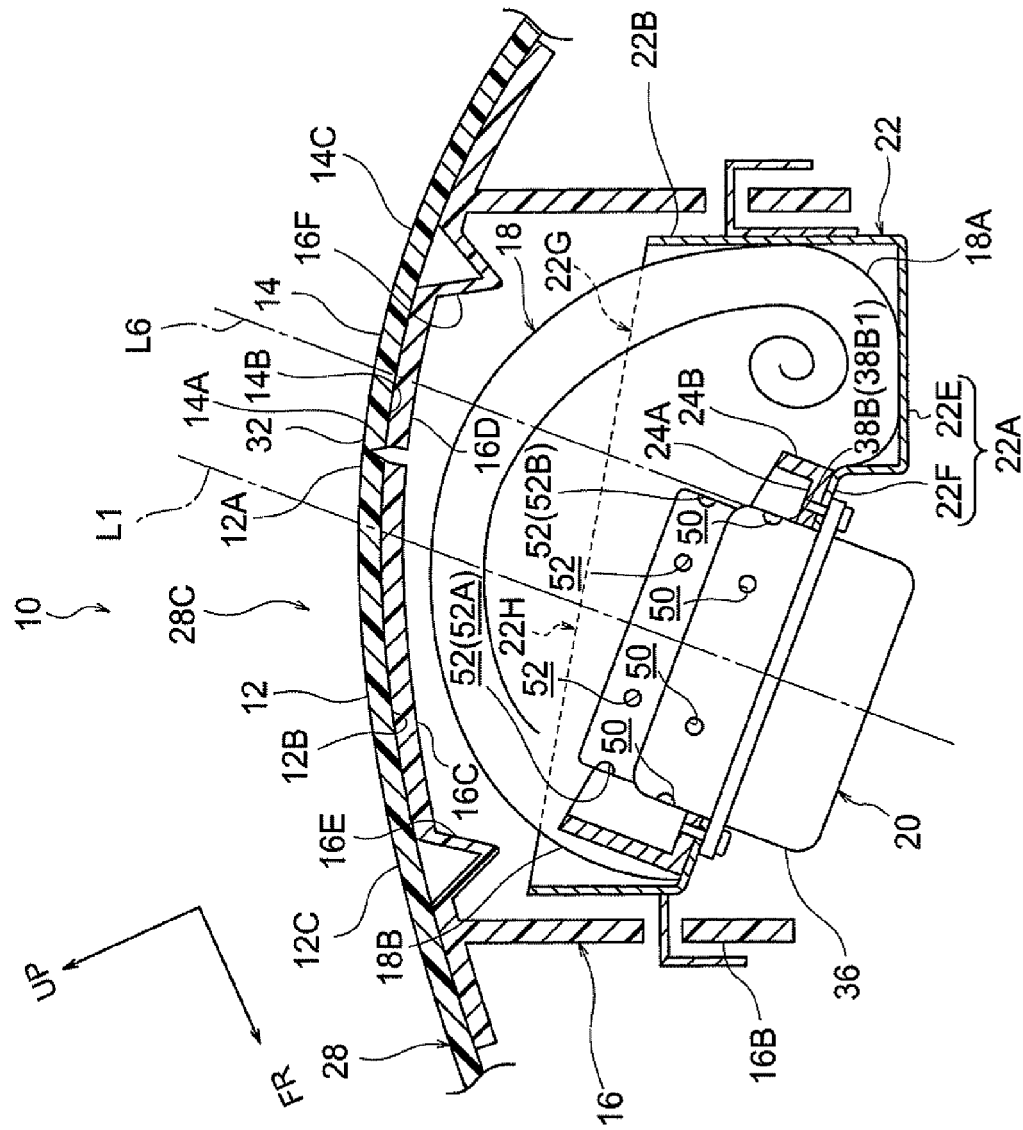
FIG. 7 is a side sectional view showing a modified example of a set position of a tear line shown in FIG. 2.

Further, in the above-described airbag device 10 for a front passenger's seat, as shown in FIG. 4, the tear line 32 is set at the intersecting portion of the central axis L1 of the inflator 20 and the central axis L3 of the case 22. However, as shown in FIG. 7, the tear line 32 may be set further toward the vehicle rear side than the central axis L1 of the inflator 20, and further toward the vehicle front side than an extension line L6 at which the rear end portion at the outer peripheral surface of the inflator 20 (in this case, the rear end portion 38B1 at the peripheral wall portion 38B of the first upper case 38) extends along the central axis L1 of the inflator 20.

When structured in this way, the length from the open end portion 14A at the airbag door 14 at the vehicle rear side, among the pair of airbag doors 12, 14, to the hinge portion 14C can be made to be shorter. Due thereto, for example, when the airbag door 14 at the vehicle rear side is opened accompanying the inflation of the airbag 18, even in a case in which the passenger of the front passenger's seat is near to this airbag door 14 at the vehicle rear side, the impact that is applied to the passenger from this airbag door 14 at the vehicle rear side can be reduced.

On the other hand, the length from the open end portion 12A at the airbag door 12 at the vehicle front side, among the pair of airbag doors 12, 14, to the hinge portion 12C can be made to be longer. Due thereto, the airbag door 12 at the vehicle front side is opened slowly as compared with a case in which the lengths in the vehicle front-rear direction of the pair of airbag doors 12, 14 are set to be equal (the case of FIG. 2). Therefore, reaction force toward the vehicle rear side can be imparted to the airbag 18 by this airbag door 12 at the vehicle front side.

An applied example of the above-described airbag device 10 for a front passenger's seat is described next.

Figure 8:
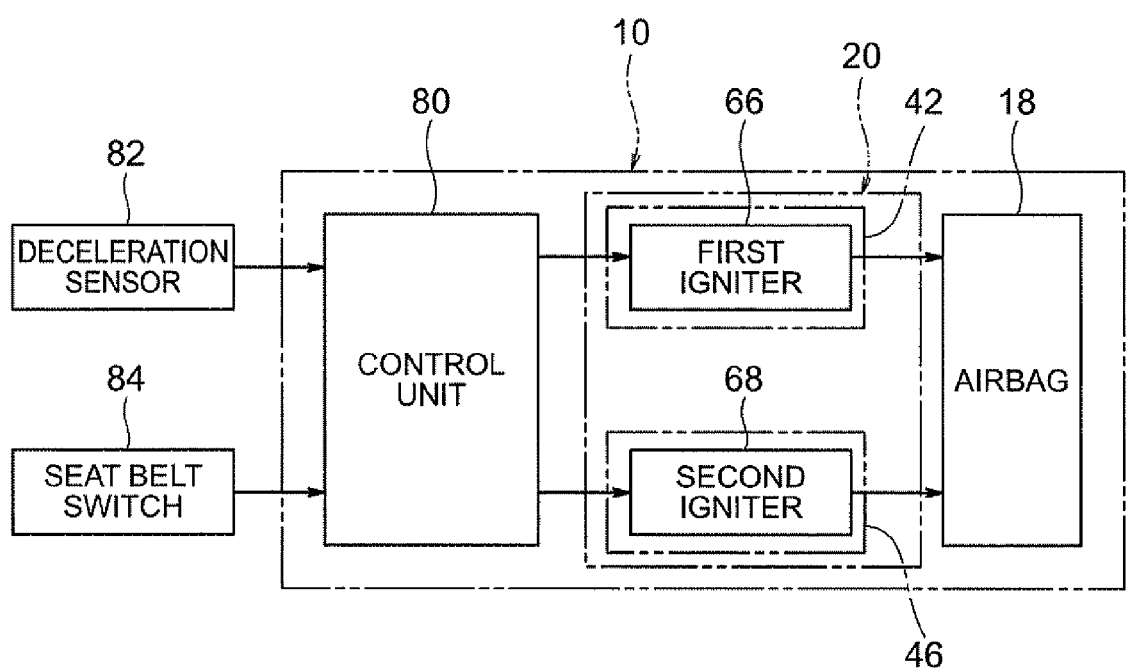
FIG. 8 is a block diagram showing the structure of the airbag device for a front passenger's seat relating to an applied example.

As shown in FIG. 8, in the present applied example, the airbag device 10 for a front passenger's seat has a control unit 80. This control unit 80 is structured by electronic circuits having a computation processing device, a storage device, and the like. A program for inflating and expanding the airbag 18 is stored in advance in the storage device of the control unit 80. The contents of this program are described later together with the operation of the airbag device 10 for a front passenger's seat. Further, a deceleration sensor 82 and a seat belt switch 84 are connected to this control unit 80.

The deceleration sensor 82 is provided at the vehicle body, and is structured so as to output a signal that corresponds to the deceleration of the vehicle to the control unit 80. The deceleration sensor 82 is illustrated singly in FIG. 8, but usually, plural deceleration sensors are provided at the vehicle body.

Further, as shown in FIG. 1, a seat belt 86 is installed at the front passenger's seat 30. A tongue 88 is provided at this seat belt 86. A buckle 90 that can engage with the tongue 88 is provided at the vehicle body. The seat belt switch 84 shown in FIG. 8 is incorporated in the aforementioned buckle 90, and is structured so as to output, to the control unit 80, signals corresponding to the engaged state and engagement cancelled state of the aforementioned tongue 88 and buckle 90.

Further, in the present applied example, the airbag device 10 for a front passenger's seat operates as follows.

Namely, at a fixed interval, the control unit 80 shown in FIG. 8 detects the signal outputted from the deceleration sensor 82 in accordance with the deceleration of the vehicle. Then, when, accompanying the vehicle front-colliding, the control unit 80 judges, on the basis of the signal outputted from the deceleration sensor 82, that the collision velocity is greater than or equal to a predetermined first threshold value, the control unit 80 executes the program for inflating and expanding the airbag 18, which program is stored in the storage device, and executes the respective steps shown in FIG. 9.

Figure 9:
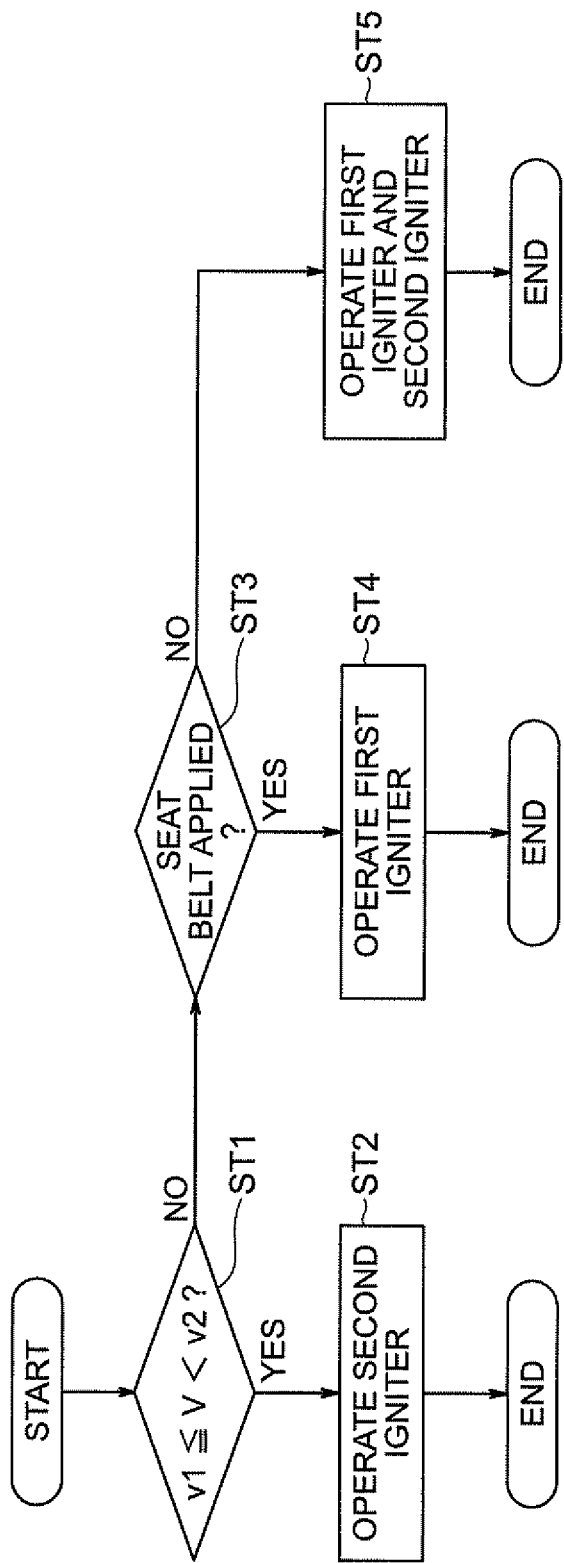
FIG. 9 is a flowchart that explains operation of the airbag device for a front passenger's seat shown in FIG. 8.

First, in step ST1 shown in FIG. 9, on the basis of the aforementioned signal outputted from the deceleration sensor 82, the control unit 80 judges whether a collision velocity V at the time of the front collision of the vehicle is greater than or equal to a first threshold value v1 and less than a second threshold value v2, or whether the collision velocity V is greater than or equal to the second threshold value v2. Here, as an example, the first threshold value v1 is set to 16 mph, and the second threshold value v2 is set to 20 mph, respectively.

Then, when the control unit 80 judges, in step ST1 shown in FIG. 9, that the aforementioned collision velocity V at the time of the front collision of the vehicle is greater than or equal to the first threshold value v1 and less than the second threshold value v2, the control unit 80 moves on to step ST2 and outputs operation current to the second igniter 68 shown in FIG. 8.

When operation current is inputted, the second igniter 68 operates, and sets on fire the second transfer charge 64 that is filled in the interior of the second inner tube member 60. Then, due thereto, the second gas generating agent 48 that is accommodated in the second combustion chamber 46 is set on fire. Further, the gas generated by the second gas generating agent 48 being set on fire passes through the second gas jetting-out holes 52 and is supplied to the interior of the airbag 18, and, due thereto, the airbag 18 is inflated and expanded at low pressure. Then, the control unit 80 ends the series of steps.

On the other hand, when the control unit 80 judges, in step ST1 shown in FIG. 9, that the collision velocity V is greater than or equal to the second threshold value v2, the control unit 80 moves on to step ST3. Then, on the basis of the signal outputted from the seat belt switch 84, the control unit 80 judges whether the tongue 88 and the buckle 90 shown in FIG. 1 are in an engaged state or are in an engagement cancelled state, i.e., whether or not the passenger of the front passenger's seat 30 has applied the seat belt 86.

Then, when the control unit 80 judges, in step ST3 shown in FIG. 9, that the passenger of the front passenger's seat 30 has applied the seat belt 86, the control unit 80 moves on to step ST4 and outputs operation current to the first igniter 66 shown in FIG. 8.

When operation current is inputted, the first igniter 66 operates, and sets on fire the first transfer charge 58 that is filled in the interior of the first inner tube member 54. Then, due thereto, the first gas generating agent 44 that is accommodated in the first combustion chamber 42 is set on fire. Further, the gas generated by the first gas generating agent 44 being set on fire passes through the first gas jetting-out holes 50 and is supplied to the interior of the airbag 18, and, due thereto, the airbag 18 is inflated and expanded at medium pressure. Then, the control unit 80 ends the series of steps.

In contrast, when the control unit 80 judges, in step ST3 shown in FIG. 9, that the passenger of the front passenger's seat 30 has not applied the seat belt 86, the control unit 80 moves on to step ST5 and outputs operation current to the first igniter 66 and the second igniter 68 shown in FIG. 8. Due thereto, gas is generated from the first combustion chamber 42 and the second combustion chamber 46, and the airbag 18 is inflated and expanded at high pressure. Then, the control unit 80 ends the series of steps.

Note that, in the present applied example, the above-described various types of judgments that the control unit 80 carries out are described schematically for ease of understanding. However, in actuality, information processing corresponding to these schematically described judgments is executed at the control unit 80.

The operation and effects of the present applied example are described next.

As described above in detail, in accordance with the present applied example, the control unit 80 judges the collision velocity before judging whether or not the seat belt 86 is applied. In a case in which the collision velocity V is greater than or equal to the first threshold value v1 and less than the second threshold value v2, the control unit 80 operates the second igniter 68 and inflates and expands the airbag 18 without judging whether or not the seat belt 86 is applied. Accordingly, the program of the control unit 80 can be simplified as compared with a case in which, for example, whether or not the seat belt 86 is applied is judged before the collision velocity is judged, and therefore, the start of the expanding of the airbag 18 can be made to be earlier.

Further, in a case in which the collision velocity V is greater than or equal to the first threshold value v1 and less than the second threshold value v2, the second igniter 68 is operated, and the airbag 18 is inflated and expanded at low pressure. On the other hand, in a case in which the collision velocity V is greater than or equal to the second threshold value v2, when the passenger of the front passenger's seat 30 has applied the seat belt 86, the first igniter 66 is operated, and the airbag 18 is inflated and expanded at medium pressure. Further, in a case in which the collision velocity V is greater than or equal to the second threshold value v2, when the passenger of the front passenger's seat 30 has not applied the seat belt 86, the first igniter 66 and the second igniter 68 are operated, and the airbag 18 is inflated and expanded at high pressure. Accordingly, because the airbag 18 is inflated and expanded at the appropriate pressure that corresponds to the collision velocity and whether or not the seat belt 86 is applied, the passenger of the front passenger's seat 30 can be protected appropriately.

Further, at the inflator 20, the second combustion chamber 46, that is set to a low output, is positioned further toward the side of the pair of airbag doors 12, 14 than the first combustion chamber 42. Accordingly, even if a passenger P of the front passenger's seat 30 has not applied the seat belt 86 and is in a state of being near to the instrument panel 28, the airbag 18 can be inflated and expanded at an early stage. Due thereto, this passenger P can be restrained rapidly.

Note that the present applied example is an example, and the airbag device 10 for a front passenger's seat can also operate other than described above.

An embodiment of the present invention has been described above, but the present invention is not limited to the above description, and, in addition to the above description, can of course be modified in various ways and executed within a scope that does not deviate from the gist thereof.

The invention claimed is:

1. An airbag device for a front passenger's seat, comprising:
    an airbag door provided at a vertical direction intermediate portion that is formed curvingly so as to be convex toward a vehicle upper side and rear side between an upper portion and a lower portion at a region in front of a front passenger's seat of an instrument panel;
    an airbag that is provided in a folded-up state at a reverse side of the airbag door, and that, when the airbag receives a supply of gas, opens the airbag door and is inflated and expanded at an obverse side of the instrument panel;
    an inflator that is disc-shaped and is provided at the reverse side of the airbag door and supplies gas to the airbag;
    a rear side accommodating portion that has a rear side bottom wall portion that is provided at the reverse side of the airbag door and faces the airbag door side, and that accommodates a lower inflating portion, that is positioned at an obverse side of a lower portion of the instrument panel, at the airbag when inflation is completed; and
    a front side accommodating portion that has a front side bottom wall portion that is formed at a vehicle front side and upper side of the rear side bottom wall portion, and to which are fixed the inflator and a base portion at a general portion that is other than the lower inflating portion at the airbag, and that is inclined with respect to the rear side bottom wall portion such that a central axis of the inflator intersects a normal line of the rear side bottom wall portion further toward a vehicle upper side than the airbag door, and the front side accommodating portion, together with the rear side accommodating portion, structures a box-shaped case that is open at the airbag door side, and the front side accommodating portion accommodates the general portion of the airbag and the inflator.

2. The airbag device for a front passenger's seat of claim 1, wherein
    a plurality of gas jetting-out holes, for jetting-out gas that is supplied to the airbag, are formed so as to be lined-up in a peripheral direction at the inflator, and
    the airbag device for a front passenger's seat comprises a retainer that has a peripheral wall portion that is extended from the front side wall portion toward the airbag door side and surrounds a periphery of the inflator with a direction along the central axis of the inflator being a height direction, and a front portion of the peripheral wall portion is set to a height that covers, of the plurality of gas jetting-out holes, gas jetting-out holes that are positioned at a vehicle front side, and a rear portion of the peripheral wall portion is set to a height that exposes, of the plurality of gas jetting-out holes, gas jetting-out holes that are positioned at a vehicle rear side.

3. The airbag device for a front passenger's seat of claim 1, wherein,
    with a direction along the normal line of the rear side bottom wall portion being a height direction, the rear side bottom wall portion is set at a height that is the same as a lowest end of the inflator, or a height that is positioned further toward the airbag door side than the lowest end of the inflator.

4. The airbag device for a front passenger's seat of claim 1, wherein
    a glove box is provided at a vehicle lower side of the rear side bottom wall portion, and
    the rear side bottom wall portion is formed parallel to a top wall portion of the glove box.

5. The airbag device for a front passenger's seat of claim 1, wherein
    the airbag is set in the folded-up state, by, from a state of being unfolded flat, left and right side portions respectively being folded-up at a central side and made into forms of bellows, and thereafter, the lower inflating portion being rolled in a form of a roll around an axis that extends in a left-right direction.

6. The airbag device for a front passenger's seat of claim 1, wherein
    the airbag door is a pair of airbag doors that are lined-up in a vehicle front-rear direction, and at which a tear line is formed between respective open end portions thereof, and
    the tear line is set further toward a vehicle rear side than the central axis of the inflator, and further toward a vehicle front side than an extension line at which a rear end portion at an outer peripheral surface of the inflator is extended along the central axis of the inflator.

7. The airbag device for a front passenger's seat of claim 2, wherein
    the inflator has a first combustion chamber, a second combustion chamber that is formed further toward the airbag door side than the first combustion chamber and is set to a lower output than the first combustion chamber, a plurality of first gas jetting-out holes that communicate with the first combustion chamber and are for jetting-out gas that is supplied to the airbag, a plurality of second gas jetting-out holes that communicate with the second combustion chamber and are for jetting-out gas that is supplied to the airbag, a first igniter for burning a gas generating agent accommodated in the first combustion chamber, and a second igniter for burning a gas generating agent accommodated in the second combustion chamber, and
    gas jetting-out holes that are exposed with respect to the rear portion of the peripheral wall portion are made to be, among the plurality of second gas jetting-out holes, the gas jetting-out holes that are positioned at the vehicle rear side, and
    the airbag device for a front passenger's seat comprises a control unit that, at a time of a front collision of a vehicle, in a case in which it is judged, on the basis of a signal outputted from a deceleration sensor in accordance with a deceleration of the vehicle, that a collision velocity is greater than or equal to a first threshold value and less than a second threshold value, operates the second igniter and inflates and expands the airbag, and, in a case in which it is judged, on the basis of the signal outputted from the deceleration sensor, that the collision velocity is greater than or equal to the second threshold value, when it is judged, on the basis of a signal outputted from a seat belt switch in accordance with whether or not a seat belt has been applied by a passenger of a front passenger's seat, that the passenger of the front passenger's seat has applied the seat belt, operates the first igniter and inflates and expands the airbag, and, in a case in which it is judged, on the basis of the signal outputted from the deceleration sensor, that the collision velocity is greater than or equal to the second threshold value, when it is judged, on the basis of the signal outputted from the seat belt switch, that the passenger of the front passenger's seat has not applied the seat belt, operates the first igniter and the second igniter and inflates and expands the airbag.

\* \* \* \* \*